US012807050B2

(12) United States Patent
Bauer

(10) Patent No.: US 12,807,050 B2
(45) Date of Patent: Nov. 24, 2026

(54) ARRANGEMENT FOR AIR CONDITIONING AT LEAST ONE CUSHIONED SURFACE

(71) Applicant: I.G.Bauerhin GmbH, Gruendau (DE)

(72) Inventor: Stefan Bauer, Alzenau (DE)

(73) Assignee: I.G.Bauerhin GmbH, Gruendau (DE)

( * ) Notice: Subject to any disclaimer, the term of this patent is extended or adjusted under 35 U.S.C. 154(b) by 313 days.

(21) Appl. No.: 18/533,341

(22) Filed: Dec. 8, 2023

(65) Prior Publication Data

US 2024/0190311 A1 Jun. 13, 2024

(51) Int. Cl.
*B60N 2/56* (2006.01)
*B60N 2/00* (2006.01)

(52) U.S. Cl.
CPC ......... *B60N 2/5621* (2013.01); *B60N 2/0025* (2023.08); *B60N 2/5692* (2013.01)

(58) Field of Classification Search
CPC .. B60N 2/5621; B60N 2/5657; B60N 2/5692; B60N 2/0025
See application file for complete search history.

(56) References Cited

U.S. PATENT DOCUMENTS

| | | | | |
|---|---|---|---|---|
| 11,993,132 B2 * | 5/2024 | Pacilli | ................ | B60H 1/00478 |
| 2016/0250905 A1 * | 9/2016 | Tanaka | ................ | B60N 2/5657 454/75 |
| 2022/0032830 A1 * | 2/2022 | Henn | .................. | B60N 2/5692 |

* cited by examiner

*Primary Examiner* — Allen R. B. Schult
(74) *Attorney, Agent, or Firm* — Carlson, Gaskey & Olds, P.C.

(57) ABSTRACT

An arrangement comprising an upholstery support structure associated with at least one upholstered surface and a thermoelectric device comprising a cold side and a warm side with heat exchange surfaces opposite one another horizontally, and which are connected together in a heat conducting manner via a Peltier element. A fan fluidically connected to the thermoelectric device via a connecting element forming a cavity. In accordance with a weight acting on the at least one upholstered surface, adjusting air distribution through the cold side and the warm side.

23 Claims, 3 Drawing Sheets

ARRANGEMENT FOR AIR CONDITIONING AT LEAST ONE CUSHIONED SURFACE

CROSS-REFERENCE TO RELATED APPLICATION

This application is a U.S. non-provisional application claiming the benefit of European Application No. 22212390.3, filed on Dec. 9, 2022, which is incorporated herein by reference in its entirety.

TECHNICAL FIELD

The present disclosure relates to a thermal conditioning arrangement for at least one upholstered surface.

BACKGROUND

Such arrangements are standardly used with vehicle seats. The arrangements usually include at least one fan for ventilating the respective seat regions or upholstered surfaces, wherein Peltier elements are frequently used for targeted temperature control of the air flows.

DE 10 2004 057 640 B4 discloses an air supply device for a vehicle seat, in particular a vehicle seat of a convertible, with at least one air outlet opening provided in the upper region of the vehicle seat, by which the head, shoulder and neck region of the seat occupant, can be exposed to an air flow, the temperature and strength of which can be adjusted via a control unit. Here, at least one Peltier element is provided with a heating surface and a cooling surface, wherein the air flow, as of a function of parameter values, via a pivotably mounted air flap, can be led over the heating surface or the cooling surface of the Peltier element. Outside parameter values which can be detected via corresponding sensors here are, on the one hand, the prevalent ambient temperature and, on the other hand, the respective prevalent travel speed with the associated air return flows. Individually adjustable default values, on the basis of which the further adjustment of the air flow can occur as a function of automatically acquirable additional parameter values, for the seat occupant are, for example, a desired minimum or maximum temperature for the air flow and a desired minimum or maximum strength of the air flow.

DE 11 2019 005 983 T5 discloses a system for thermally conditioning and moving a fluid, which includes a thermoelectric device for converting electrical energy into thermal energy. The thermoelectric device comprises a main side and a discharge side as a fluid moving device for generating a fluid flow. The fluid flow is thermally connected to the thermoelectric device, so that the thermal energy generated by the thermoelectric device is transferred to or from the fluid flow. The system moreover includes a flow control valve configured to lead the fluid flow selectively along a main side fluid flow path and/or a discharge side fluid flow path. The flow control valve can contain a lamella or flap. The position of the lamella can proportion the fluid flow provided by the fluid moving device between the main side and the discharge side flow paths. The position of the lamella can be controlled by a motor (for example, a servo motor, a step motor or another type of motor) or an actuator.

However, although a targeted air conveyance is possible by the above-described embodiments, it can be achieved only by electronic closed-loop or open-loop modules used specifically for this purpose.

SUMMARY

The subject disclosure provides a thermal conditioning arrangement that allows a closed-loop control/open-loop control of the air conveyance which is simplified in comparison to the known prior art.

An arrangement according to one example of the disclosure, provides thermal conditioning of at least one upholstered surface associated with an upholstery support structure. In one example, the arraignment comprises a thermoelectric device as well as a fan, wherein the fan is fluidically connected to the thermoelectric device via a connecting element forming a cavity. The thermoelectric device includes a respective cold side and a respective warm side with heat exchange surfaces opposite one another horizontally, and which are connected together in a heat conducting manner via a Peltier element. In accordance with a weight acting on the upholstered surface, the air distribution is adjusted through the cold side and the warm side.

In one implementation, the arrangement comprises a load-dependent self-regulating system that dispenses with additional electronic components for closed-loop control or open-loop control of the air conveyance. The air supply is adjusted only in accordance with the weight (load) acting on an upholstered surface such as, in particular, a seat or backrest surface of a vehicle seat.

The thermoelectric device, in one example, includes a housing, wherein the air distribution can be adjusted with at least one dimensionally stable air baffle extending beyond an outer circumference of the housing into the cavity formed by the connecting element.

In a loaded state, for example due to a vehicle occupant sitting on the upholstered surface, the thermoelectric device tilts as a function of the weight of the occupant, whereby the volume flow of the air flowing through the heat exchange surfaces is influenced. Thus, in particular, an increased air flow through the heat exchange surfaces on the cold side of the thermoelectric device is achieved.

Due to the load-dependent tilt of the thermoelectric device and thus also of the at least one air baffle, in the loaded state the air passageway through the heat exchange surfaces changes both on the cold side and on the warm side of the thermoelectric device. In other words, the quantity of the air flowing through the respective heat exchange surfaces is a function of the weight acting on the arrangement.

The at least one air baffle can be formed differently in terms of its orientation. In the unloaded state, the or each air baffle preferably extends substantially horizontally into the cavity formed by the connecting element, when viewed in flow direction. In particular, the or each air baffle can be designed in the shape of a wedge, wherein the wedge tip advantageously points in the direction of the fan. Here, the wedge tip of the or each air baffle is designed so that no air vortices form in this region. A wedge is a body in which two lateral surfaces converge at an acute angle and form a wedge tip. To prevent the formation of air vortices, the wedge tip is designed with a tangentially tapering rounding on two opposite lateral surfaces.

In particular, the at least one air baffle extends substantially parallel to the extension direction of the heat exchange surfaces or substantially parallel to the extension direction of the Peltier element. In other words, the air baffle extends substantially parallel to the respective upholstered surface both of a seat surface and of a backrest surface of a vehicle seat.

In one example embodiment of the disclosure, the at least one air baffle is designed to form a single piece with the housing. The or each air baffle and the housing can thus be manufactured in a common manufacturing step.

Alternatively, the at least one air baffle is fastened on the housing of the thermoelectric device with a frame. In the sense of the present disclosure, a frame is understood to mean, in particular, a fastening element which allows a simple attachment of the or each air baffle on the thermoelectric device. The geometric dimensions of the frame are here advantageously tailored to the dimensions of the housing. In principle, the frame can be designed to form a single piece or multiple pieces, thus with multiple frame elements.

On example embodiment provides that the frame or the individual frame elements are designed as part of the housing of the thermoelectric device, thus forming a single piece with said housing. Alternatively, the frame can also preferably be manufactured to form a single piece with the at least one air baffle and be arranged together with said air baffle on the housing of the thermoelectric device. In both cases the frame can be designed or arranged in its completely or only partially on the front side of the housing. Front side is understood to mean the side of the housing of the thermoelectric device through which an air flow generated by the fan flows via the connecting element through the exchange surfaces.

Moreover, the frame is designed as a separate component and is used as the connecting element of the or each air baffle to the housing of the thermoelectric device.

In one example, the Peltier element includes the at least one air baffle. The at least one air baffle is then manufactured to form a single piece with the Peltier element. In other words, the at least one air baffle is formed as part of the thermoelectric device by a lengthening of the Peltier element. In a further example embodiment, the at least one air baffle—as separate component—is arranged on the Peltier element, for example, by affixing or gluing.

Alternatively, the at least one air baffle is formed by a lengthening of at least one of the heat exchange surfaces. In particular, a lengthened heat exchange surface on the cold side of the thermoelectric device is advantageous.

Preferably, the connecting element is reversibly deformable as a function of weight. If an upholstered surface is loaded, for example by the weight of an occupant sitting on it, the connecting element can deform (for example, in the sense of a sag) and thus follow the tilt of the thermoelectric device and/or the tilt of the fan. If the loading stops, the connecting element again assumes its original shape.

In one example, the connecting element comprises an elastomer material, wherein, in particular, a rubber-like or elastic material is used, which allows a reversible change. Alternatively, the connecting element can be manufactured with a thin wall out of a thermoplastic plastic such as polyethylene (PE) or polypropylene (PP). It is likewise possible to use a connecting element made of a coated nonwoven material.

In one example, the connecting element is designed as a bellows which can react in a particularly flexible manner to the positional changes of the thermoelectric device and/or of the fan caused by the action of the weight.

In one example, the connecting element is detachably fastened on the housing of the thermoelectric device. Here in particular, latching or clamping connections are advantageous.

In one example, the fan includes a fan housing on which the connecting element is detachably fastened. The fan housing, for example, includes two housing portions detachably connected to one another and forming a hollow interior space. The interior space of the fan housing is used for accommodating an impeller which, during operation, suctions air through a suction opening into the interior space of the fan housing and conveys the air via at least one outflow opening formed in the fan housing via the connecting element to the thermoelectric device. The detachable fastening of the connecting element on the fan housing is achieved by a latching or clamping connection, for example.

In another example embodiment of the disclosure, the fan includes an additional bearing plate which is arranged on the fan housing. In particular, the bearing plate is latched to a housing portion or to both housing portions and comprises, for example, a fastener that fastens on an upholstery support structure and/or a fastener associated with electric components or cables.

The connecting element is, in one example, detachably fastened on the housing of the thermoelectric device. Here too, a latching or a clamping is advantageous.

In one example embodiment, the thermoelectric device and/or the fan is/are pivotably mounted on the upholstery support structure. For this purpose, at least one respective fastener is formed on the housing of the thermoelectric device, and/or on the fan housing, or on the additional bearing plate arranged on said housing.

BRIEF DESCRIPTION OF THE DRAWINGS

Additional details and features of the disclosure result from the following description of embodiment examples in reference to the drawing. In the drawings.

DETAILED DESCRIPTION

Figure 1:
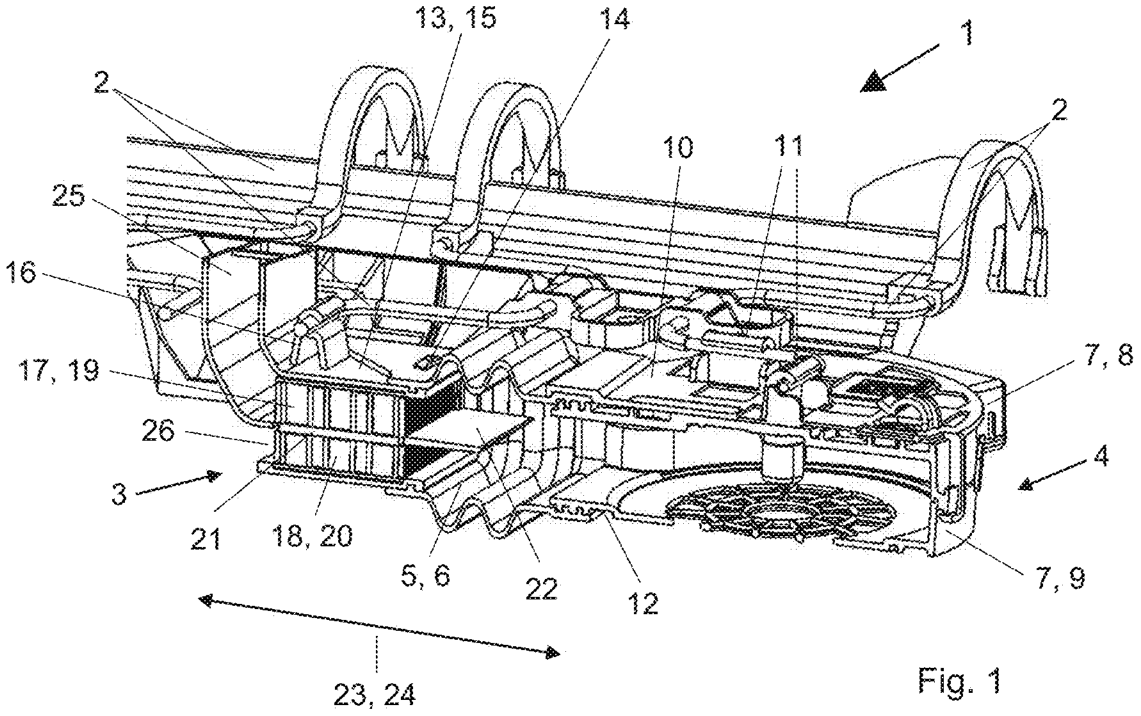
FIG. 1 shows a first arrangement for air conditioning an upholstered seat in a cross-sectional representation.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

"One or more" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms “a”, “an” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

As used herein, the term “if” is, optionally, construed to mean “when” or “upon” or “in response to determining” or “in response to detecting,” depending on the context. Similarly, the phrase “if it is determined” or “if [a stated condition or event] is detected” is, optionally, construed to mean “upon determining” or “in response to determining” or “upon detecting [the stated condition or event]” or “in response to detecting [the stated condition or event],” depending on the context.

It should be understood that terms such as “about,” “substantially,” and “generally” are not intended to be boundaryless terms, and should be interpreted consistent with the way one skilled in the art would interpret those terms.

Identical components are provided with identical reference numerals in the figures.

FIG. 1 shows a first arrangement 1 for thermal, e.g., air, conditioning an upholstered seat in a cross-sectional representation. The arrangement 1 includes an upholstery support structure 2, a thermoelectric device 3, and a fan 4. In the unloaded state, the fan 4 and the thermoelectric device 3 are arranged in alignment, both in the backrest and/or the seat of a vehicle seat. The two components 3, 4 are fluidically connected to one another via the connecting element 6 forming a cavity 5.

The fan 4 comprises a fan housing 7 made of a plastic with a housing upper portion 8 and a housing lower portion 9. The housing portions 8, 9 are latched to one another. On the housing upper portion 8, an additional bearing plate 10 with two fasteners 11 is arranged. In the present case, the fan 4 is not pivotably fastened on the upholstery support structure 2 via the fasteners 11.

The connecting element 6 is manufactured in the form of a bellows from an elastic plastic. For fastening on the fan housing 7, the connecting element 6 is moved over the outer circumference 12 of the fan housing 7 and latched on the housing portions 8, 9. In addition, the connecting element 6 on the housing upper portion 8 is overlapped by the bearing plate 10.

The air suctioned by the fan 4 flows via the connecting element 6 to the thermoelectric device 3. The thermoelectric device 3 includes a housing 13 with at least one latching lug 14 on which the connecting element 6 is latched. Moreover, on the upper side 15 of the housing 13 which, in the installed state, is directed towards the upholstery (not represented), at least one fastener 16 is formed, by which the thermoelectric device 3 is pivotally mounted on the upholstery support structure 2.

Within the housing 13 of the thermoelectric device 3, heat exchange surfaces 17, 18 opposite one another horizontally are formed, which form a respective cold side 19 and a respective warm side 20. The heat exchange surfaces 17, 18 are connected to one another in a heat conducting manner via a Peltier element 21.

On the Peltier element 21, an air baffle 22, designed in the shape of a wedge, is affixed as a separate dimensionally stable component. The air baffle 22, in the unloaded state shown here, extends substantially parallel to the extension direction 23 of the heat exchange surfaces 17, 18 or to the extension direction 24 of the connecting element 6 into the cavity 5 thereof. Via the air baffle 22, as a function of a weight acting on the upholstered surface, the air distribution through the warm side 20 and the cold side 19 can be adjusted. Additional electronic components for closed-loop control of the air conveyance are not necessary thanks to this weight-dependent air distribution.

Figure 2:
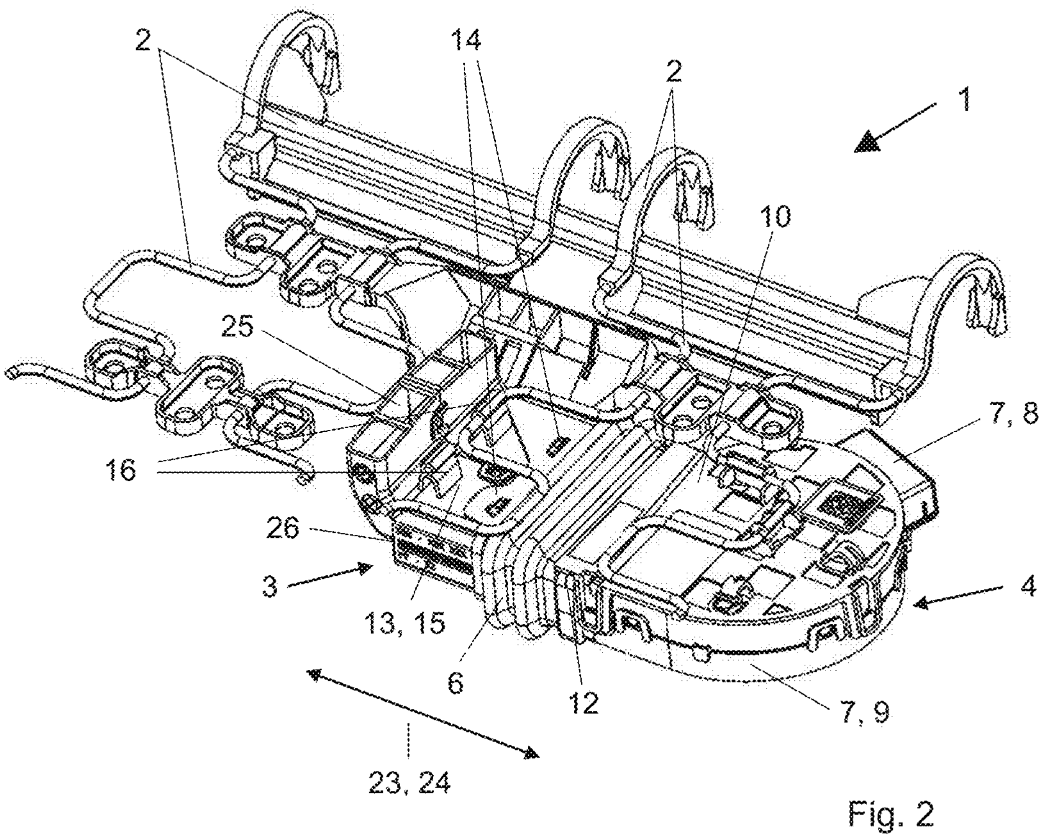
FIG. 2 shows the arrangement for air conditioning according to FIG. 1 in a perspective view.

In FIG. 2, the arrangement 1 according to FIG. 1 is shown in a perspective view. Here, the latching of the bellows-designed connecting element 6 to the housing 13 of the thermoelectric device 3 can clearly be seen. The air suctioned by the fan 4 flows from said fan through the bellows, and, after flowing through the heat exchange surfaces 17, 18, it flows out of the air outlet openings 25, 26 on the cold side 19 and on the warm side 20. The air led out of the air outlet opening 25 of the cold side 19 is supplied to an upholstered surface (not represented) of an upholstered seat (not represented) and the air led out of the air outlet opening 26 of the warm side 20 is supplied, for example, to an interior space of a vehicle which is not represented. Here the quantity of the air flowing out respectively on the cold side 19 and on the warm side 20 is dependent on the weight acting on the arrangement 1 in the installed state.

Figure 3:
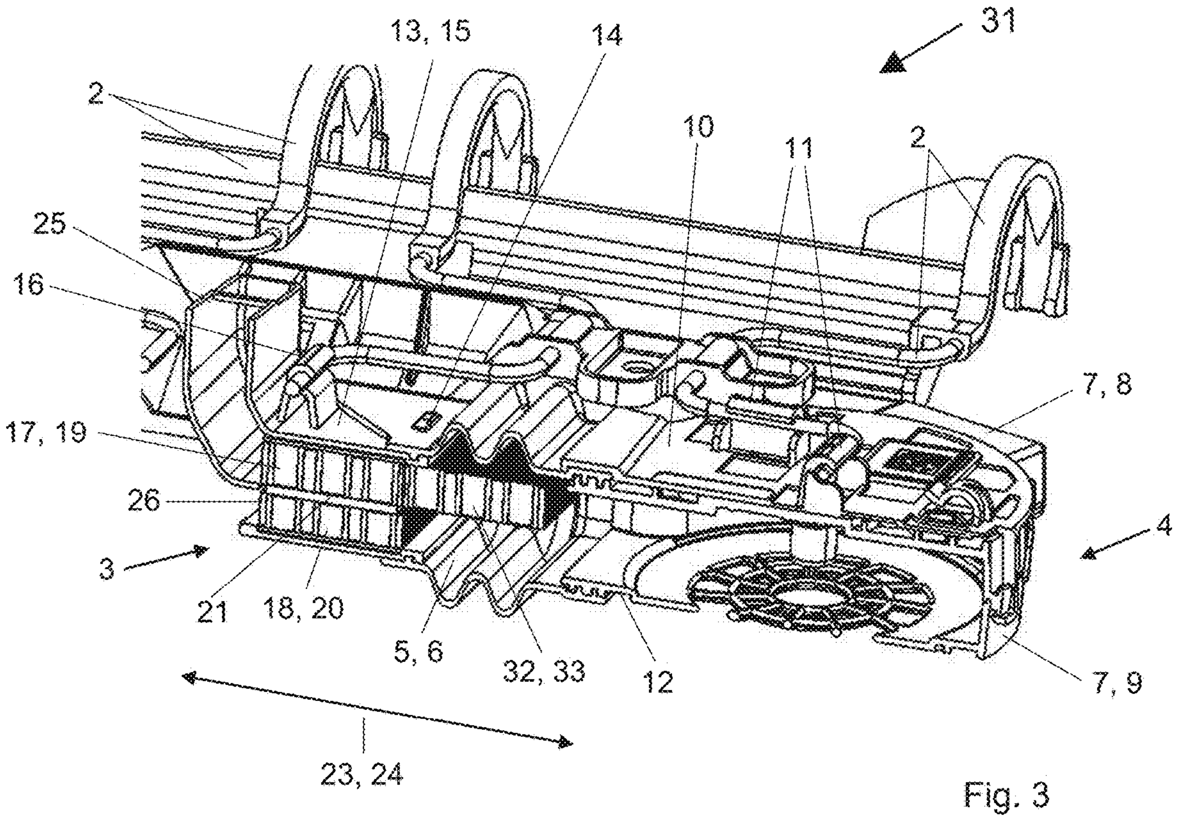
FIG. 3 shows a second arrangement for air conditioning an upholstered seat in a cross-sectional representation.

In FIG. 3, a second arrangement 31 for air conditioning is shown in a cross-sectional representation. Said arrangement differs from the arrangement 1 according to FIG. 1 by the embodiment of the air baffle 32. Said air baffle is formed in the present case by the lengthening 33 of the heat exchange surface 17 of the cold side 19 of the thermoelectric device 3 and extends into the cavity 5 formed by the connecting element 6. In other words, the heat exchange surface 17 of the cold side 19 is used both for air cooling and also for adjusting the air distribution.

Figure 4:
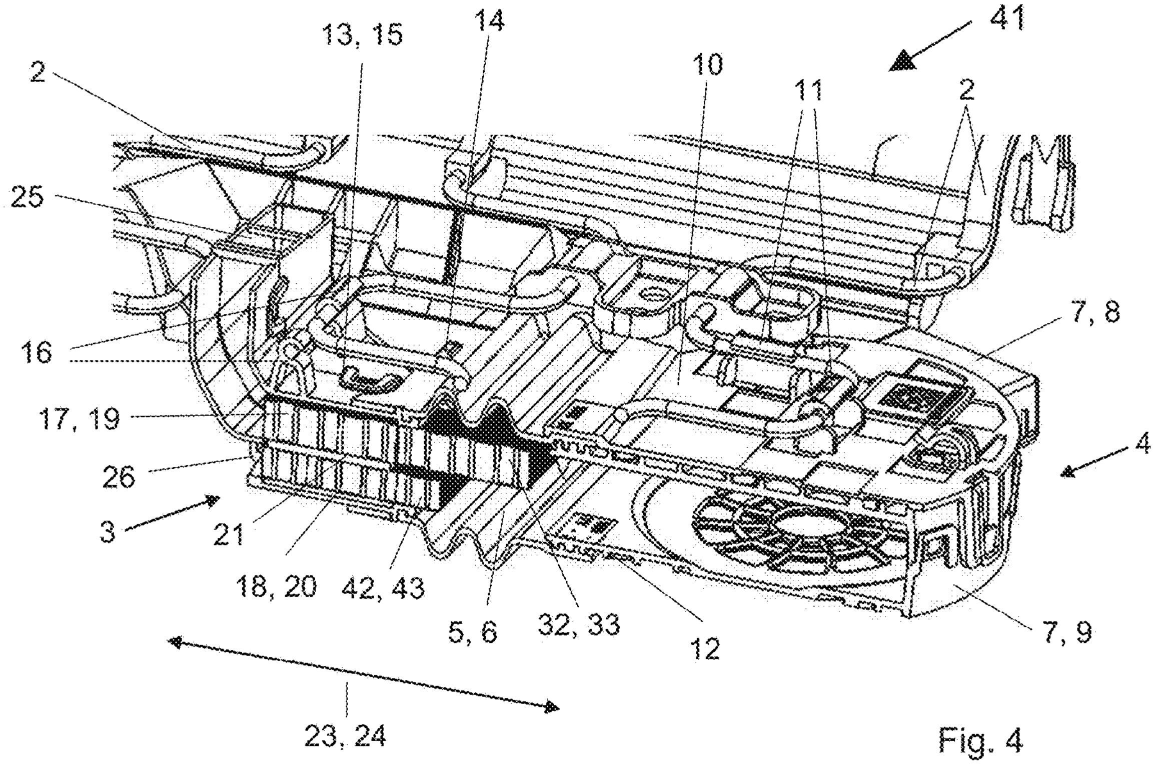
FIG. 4 shows a third arrangement for air conditioning an upholstered seat in a cross-sectional representation.

In FIG. 4, an arrangement 41 for air conditioning is represented in a cross-sectional representation, in which, in addition to the lengthened heat exchange surface 17 of the cold side 19, the heat exchange surface 18 of the warm side 20 is also lengthened. Due to the lengthening 42 of the heat exchange surface 18 of the warm side 20, an additional air baffle 43 is formed. In the present case, the air baffle 32 formed by the lengthening 33 of the heat exchange surface 17 of the cold side 19 extends further into the cavity 5 than the lengthening 42 of the heat exchange surface 18 of the warm side 20.

Figure 5:
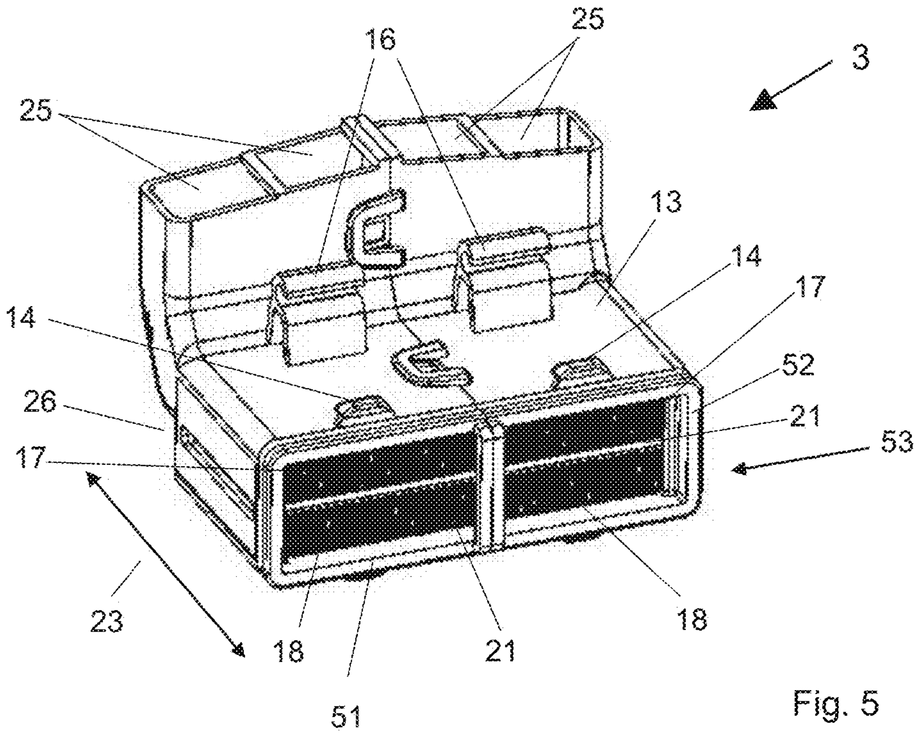
FIG. 5 shows a thermoelectric device with frame elements arranged on the housing thereof in a perspective view.

FIG. 5 shows the thermoelectric device 3, on the housing 13 of which two frames 51, 52 are arranged. The frames 51, 52 are latched on the front side 53 of the housing 13 on said housing and serve to hold or fasten air baffles.

Figure 6:
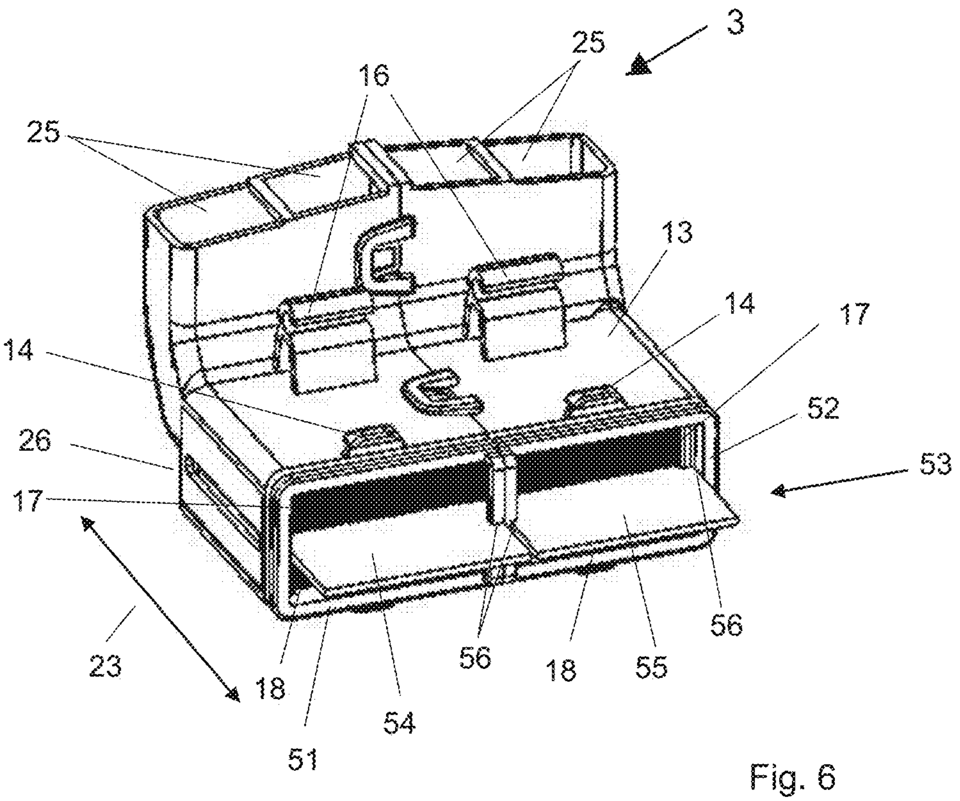
FIG. 6 shows the thermoelectric device according to FIG. 4 with air baffles arranged on the frame elements.

Said air baffles can be seen in FIG. 6. The air baffles 54, 55 comprise respective recesses 56, via which the air baffles 54, 55 are positioned on the frames 51, 52. For improved fixation, the air baffles 54, 55 can additionally be glued on or to the frames 51, 53.

LIST OF REFERENCE NUMERALS

1 Arrangement for air conditioning
2 Upholstery support structure

3 Thermoelectric device
4 Fan
5 Cavity
6 Connecting element
7 Fan housing
8 Housing upper portion
9 Housing lower portion
10 Bearing plate
11 Fastener
12 Outer circumference
13 Housing (of the thermoelectric device)
14 Latching lug
15 Upper side of housing
16 Fastener
17 Heat exchange surface
18 Heat exchange surface
19 Cold side
20 Warm side
21 Peltier element
22 Air baffle
23 Extension direction of heat exchange surface
24 Extension direction of connecting element
25 Air outlet opening on cold side
26 Air outlet opening on warm side
31 Arrangement for air conditioning
32 Air baffle
33 Lengthening on cold side
41 Arrangement for air conditioning
42 Lengthening on warm side
43 Air baffle
51 Frame
52 Frame
53 Front side
54 Air baffle
55 Air baffle
56 Recess Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An arrangement comprising:
- an upholstery support structure associated with at least one upholstered surface;
- a thermoelectric device comprising a cold side and a warm side with heat exchange surfaces opposite one another horizontally which are connected together in a heat conducting manner via a Peltier element, wherein the thermoelectric device is movable relative to the upholstery support structure;
- a fan fluidically connected to the thermoelectric device via a connecting element forming a cavity; and
- at least one baffle associated with the thermoelectric device, and in accordance with a weight acting on the at least one upholstered surface, adjusting air distribution through the cold side and the warm side via the at least one baffle.

2. The arrangement according to claim 1, wherein the thermoelectric device includes a housing, and wherein the air distribution is adjustable with the at least one baffle that is dimensionally stable and extends beyond an outer circumference of the housing into the cavity formed by the connecting element.

3. The arrangement according to claim 2, wherein the at least one baffle extends horizontally into the cavity formed by the connecting element.

4. The arrangement according to claim 2, wherein the at least one baffle comprises a single piece with the housing.

5. The arrangement according to claim 2, wherein the at least one baffle is fastened on the housing via a frame.

6. The arrangement according to claim 2, wherein the Peltier element includes the at least one baffle.

7. The arrangement according to claim 2, wherein the at least one baffle is arranged on the Peltier element.

8. The arrangement according to claim 1, wherein the connecting element is reversibly deformable as a function of the weight.

9. The arrangement according to claim 1, wherein the connecting element comprises an elastomer material.

10. The arrangement according to claim 1, wherein the connecting element comprises a bellows.

11. The arrangement according to claim 1, wherein the connecting element is detachably fastened on a housing of the thermoelectric device.

12. The arrangement according to claim 1, wherein the fan includes a fan housing, and wherein the connecting element is detachably fastened to the fan housing.

13. The arrangement according to claim 1, wherein at least one of the thermoelectric device and the fan is pivotably mounted on the upholstery support structure.

14. The arrangement according to claim 1, wherein the thermoelectric device is moveable in response to weight acting on the at least one upholstered surface, and wherein movement of the thermoelectric device causes the at least one baffle to shift position within the cavity for adjusting air distribution through the thermoelectric device.

15. An arrangement comprising:
- an upholstery support structure associated with at least one upholstered surface;
- a thermoelectric device comprising a cold side and a warm side with heat exchange surfaces opposite one another horizontally which are connected together in a heat conducting manner via a Peltier element;
- a fan fluidically connected to the thermoelectric device via a connecting element forming a cavity;
- in accordance with a weight acting on the at least one upholstered surface, adjusting air distribution through the cold side and the warm side;
- the thermoelectric device includes a housing, and wherein the air distribution is adjustable with at least one dimensionally stable air baffle extending beyond an outer circumference of the housing into the cavity formed by the connecting element; and
- wherein the at least one dimensionally stable air baffle is formed by a lengthening of at least one of the heat exchange surfaces.

16. An arrangement comprising:
- an upholstery structure;
- a thermoelectric device including a device housing associated with the upholstery structure, the thermoelectric device comprising a cold side and a warm side with heat exchange surfaces facing opposite directions, and wherein the thermoelectric device is mounted for movement relative to the upholstery structure;

a Peltier element connecting the heat exchange surfaces;

a fan including a fan housing associated with the upholstery structure;

a connecting element fluidly connecting the fan with the thermoelectric device, wherein the connecting element comprises a cavity; and at least one baffle, wherein in accordance with a weight acting on the upholstery structure, adjusting air distribution through the cold side and the warm side with the at least one baffle.

17. The arrangement according to claim 16, wherein the connecting element comprises a bellows extending between the fan housing and the device housing.

18. The arrangement according to claim 16, wherein one or both of the fan housing and the device housing are pivotally mounted to the upholstery structure.

19. The arrangement according to claim 16, wherein the arrangement is a load-dependent self-regulating system in which, in a loaded state, the thermoelectric device tilts as a function of the weight acting on the upholstery structure, causing the at least one baffle to shift position within the cavity to adjust the air distribution through the cold side and the warm side.

20. A method comprising:

associating a thermoelectric device with an upholstery structure such that the thermoelectric device is movable relative to the upholstery structure, wherein the thermoelectric device comprises a cold side and a warm side with heat exchange surfaces facing opposite directions;

connecting the heat exchange surfaces with a Peltier element;

associating a fan with the upholstery structure;

fluidly connecting the fan with the thermoelectric device with a connecting element that comprises a cavity; and in accordance with a weight acting on the upholstery structure, adjusting air distribution through the cold side and the warm side with at least one baffle.

21. The method according to claim 20, wherein the thermoelectric device includes a device housing, and wherein the fan includes a fan housing, and the method including:

pivotally mounting the fan housing to the upholstery structure; or pivotally mounting the device housing to the upholstery structure.

22. The method according to claim 21, wherein the connecting element comprises a bellows, and including extending the bellows between the fan housing and the device housing.

23. The method according to claim 20, wherein the thermoelectric device is moveable in response to weight acting on the upholstery structure, and including:

having movement of the thermoelectric device cause the at least one baffle to shift position within the cavity to adjust air distribution through the cold side and the warm side.

* * * * *